(12) United States Patent
Bublik et al.

(10) Patent No.: US 12,134,149 B2
(45) Date of Patent: Nov. 5, 2024

(54) DEVICE FOR THE ORBITAL PROCESSING OF NON-ROTATING JOINTS AND PIPE ENDS

(71) Applicant: OBSCHESTVO S OGRANICHENNOI OTVETSTVENNOSTYU "WELDUP", Moscow (RU)

(72) Inventors: Dmitry Alexeevich Bublik, r.p. Markova (RU); Iliya Alexeevich Efimov, Ulan-Ude (RU); Roman Vladimirovich Kononenko, pos. Kysyl-Syr (RU); Egor Vladimirovich Kuzin, Irkutsk (RU)

(73) Assignee: OBSCHESTVO S OGRANICHENNOI OTVETSTVENNOSTYU "WELDUP", Moscow (RU)

( * ) Notice: Subject to any disclaimer, the term of this patent is extended or adjusted under 35 U.S.C. 154(b) by 1052 days.

(21) Appl. No.: 17/046,001

(22) PCT Filed: Oct. 28, 2019

(86) PCT No.: PCT/RU2019/050204
§ 371 (c)(1),
(2) Date: Oct. 8, 2020

(87) PCT Pub. No.: WO2020/101541
PCT Pub. Date: May 22, 2020

(65) Prior Publication Data
US 2021/0069812 A1   Mar. 11, 2021

(30) Foreign Application Priority Data

Nov. 12, 2018   (RU) .................................. 2018139815

(51) Int. Cl.
*B23K 9/028* (2006.01)

(52) U.S. Cl.
CPC .................................. *B23K 9/0286* (2013.01)

(58) Field of Classification Search
CPC .. B23K 9/0286; B23K 2103/04; B23K 9/167; B23K 9/173; B23K 10/00; B23K 10/02;
(Continued)

(56) References Cited

U.S. PATENT DOCUMENTS 3,102,187 A * 8/1963 Coscia ................. B23K 9/0286
219/60 A
3,840,170 A * 10/1974 Arikawa ............. B23K 9/0286
228/32

(Continued)

*Primary Examiner* — Brian W Jennison
*Assistant Examiner* — Kristina J Babinski
(74) *Attorney, Agent, or Firm* — Boyle Fredrickson, S.C.

(57) ABSTRACT

The present device is configured for mounting on and movement around the outside surface of a pipe to be processed, and includes a clamping device- and a flexible composite carriage including at least two pivotally connected component parts capable of pivoting about a pin of a hinged connection lying parallel to the axis of the, wherein each part comprises a group of at least two coaxial supporting rollers, the axis of which is situated at a distance from the hinged connection that is less than or equal to ⅓ of the distance between the hinges of the component part and is parallel to the axis of the pipe to be processed. The component parts are connected in succession such that each part bears on two groups of supporting rollers, one of which is mounted on the component part, and the other of which on an adjacent component part.

9 Claims, 5 Drawing Sheets

(58) Field of Classification Search
CPC ............ B23K 37/0264; B23K 37/0276; B23K 37/0288; B23K 37/0282; B23K 2101/06; B23K 2101/10
See application file for complete search history.

(56) References Cited

U.S. PATENT DOCUMENTS

| | | | | |
|---|---|---|---|---|
| 6,244,189 | B1* | 6/2001 | Kingsley | B23K 37/0294 104/119 |
| 7,003,893 | B1* | 2/2006 | Phuly | B23K 9/0286 33/561.1 |
| 2010/0187287 | A1* | 7/2010 | Greenwall | B23K 9/0284 228/45 |
| 2017/0252845 | A1* | 9/2017 | Cash | B23K 37/0282 |
| 2017/0276260 | A1* | 9/2017 | Bonel | F16L 13/02 |
| 2017/0320148 | A1* | 11/2017 | Eisenhardt | B23D 21/04 |

* cited by examiner

DEVICE FOR THE ORBITAL PROCESSING OF NON-ROTATING JOINTS AND PIPE ENDS

FIELD OF THE INVENTION

The invention relates to devices for orbital processing-welding, cutting, edging, cleaning of non-rotating butt joints of pipes, including preinsulated pipes. The device can be used in field and factory environment, including confined spaces.

BACKGROUND

It is known a welding device for pipe butt welding, which comprises at least one welding carriage comprising at least one welding head, which has at least one welding torch, wherein the said welding device is installed and movable along butt joint plane between welded pipes by means of orbital holder. The holder is configured to translate along the pipeline being formed and to move and position the said welding device along the butt joint plane between welded pipes. Ring segments of the orbital holder are configured to draw apart in the guides in the plane perpendicular to the axial plane of welded pipes and/or to turn into a position where they move along the pipes. [RU2441738, B23K37/053; B23K37/02. Orbital holder comprising at least two elements in the form of ring segments connected to each other; butt welding device for pipeline formation comprising such orbital holder/Dupont Thierry (FR) et al.; Serimax (FR).—2008141709/02; claimed on 28.03.2007; published on 10 Feb. 2012] [1].

The known device has large weight and size. Therefore, it is not applicable for welding in confined spaces, for welding in channels and trenches. Readjustment to different diameters involves replacement of orbital holder and requires much time. Actually, this device is stationary.

It is known a device for multiple-pass welding of non-rotating butt joints of pipes comprising a base, geared plate with welding torch, reversible drive for geared plate rotation, control system with control unit for pass beads alignment and disposition of pass butts made in the form of a reduction gear. Reduction gear casing is installed on the base. [RU2049633, B23K37/053; B23K9/028; B23K 31/02; Device for multiple-pass welding of pipe non-rotating butt joints/E. I. Gorlov et al.; Central Research Institute for Shipbuilding Technology.—Application 5030201/08; claimed on 04.02.1992, published on 10 Dec. 1995.] [2].

The device can be used for multiple-pass welding of heavy-wall pipe butt joints in any confined spaces.

The disadvantageous features of the known solution are as follows: complicated mechanical schematic of the device caused by availability if several reduction gears and drives, each diameter of the welded pipeline requires installation of a geared plate of corresponding diameter. Adjustment of the device to each diameter butt joint is complicated, and the parameters of such adjustment cannot be changed during welding. Exact positioning of the geared plate with respect to the welded butt joint plane requires significant amount of time and is complicated by large weight of the device.

There are known data about orbital welding equipment being a part of the device for welding straight-through pipe and bent pipe. The device comprises a fixed support table for pipes, pipe support table rotatable in horizontal plane around vertical axis of a pipe located on the support axis. Each table comprises a base equipped with rails. The orbital welding device is also installed on a table equipped with rails. A ring of the circular welding guide is installed vertically and configured to slide. The ring is moved vertically by means of a motor. The ring comprises two parts pivotally connected and fixed. The ring upper part is turnable for pipe insert. Welding apparatus engages a groove of the circular ring and is put in motion around the ring by means of a motor acting through gear wheels. Torch and guide roller of the pipeline are vertically moved together. Welding wire is delivered to flame from the drum. [GB1465959 (A), MITSUI SHIPBUILDING ENG, B23K37/053; B23K9/0280, 02.03.1977] [3].

The known device for pipe orbital welding has large weight and size, is stationary, not applicable for welding in confined spaces and for welding preinsulated pipes. Readjustment for welding pipes of different diameters requires replacement of a guide ring.

It is known a device for pipe orbital gas-flame cutting, which comprises a carriage with rollers, drive with a handle, cutter with fixing mechanism, flexible metal band and its tensioning device. Cutter fixing mechanism is positioned symmetrically with respect to the carriage transverse plane, screw of the tensioning mechanism is positioned above the carriage longitudinal axis, and tensioning mechanism tightening elements are made in the form of rollers configured to rotate. [U.S. Pat. No. 2,179,099, IPC B23K7/10, B23K37/02 Pipe oxygen cutting machine]. The device moves around a pipe pressed by flexible metal band. The device is not equipped with a guiding device or guiding template fixed on the pipe, therefore, when the device rotates around the pipe, traverse displacement of the device carriage relative to cutting could occur due to band flexibility. The devices require precise installation of band at its tensioning.

The closest analogous solution of the claimed invention is an apparatus for welding pipes. The known apparatus for welding pipes comprises a carriage movable around a pipe at pipes butt joint, flexible tensioning element connected to the carriage and configured to pass around a pipe for holding the carriage on the pipe, carriage power device for moving the carriage and tensioning element around a pipe. The device comprises a welding head installed on the carriage for seam welding when carriage is moved around the pipe [U.S. Pat. No. 3,102,187. Apparatus for welding pipes/George A. Coscia claims 6-8.—No. 69025; claimed on 14.11.1960; published on 27 Aug. 1963.] [4]. The device has one welding carriage with a welding torch installed. The feature of the above said device is rotation of the welding carriage together with flexible tensioning element around a pipe, i.e. there is no a guiding device or guiding template fixed on the pipe. Due to flexibility of the tensioning element, minor deformations of a pipe, availability of a longitudinal weld on the pipe, metal splashes on the pipe outer surface, pipe ovality the welding carriage together with flexible tensioning element will inevitably deviate from the weld path that will result in impossibility of making quality weld and in necessity to constantly correct the welding torch position.

SUMMARY OF THE INVENTION

The purpose of the claimed invention is creation of the device for processing non-rotating butt joints of pipes with a simplified procedure of device installation/dismantling on/from the pipe, ensuring accuracy of the device movement along a butt joint taking into account possible pipe defects, with reduced device dimensions in radial and axial direction.

The technical result of the claimed invention is the simplified procedure of device installation/dismantling on/from the pipe, ensuring accuracy of the device movement along a butt joint taking into account possible pipe defects without using a guiding ring or template, reducing the device dimensions in radial and axial direction, ability to install functional units of various applications-welding, cutting, bevelling, etc., avoidance of device slipping.

The technical result of the claimed invention is achieved due to the device for orbital processing of ends and non-rotating butt joints of a pipe configured for installation and movement around an outer surface of the pipe and comprising a clamping device and a flexible composite carriage consisting of at least two components joined together via a pivotal connection and configured to pivot only around a pivot pin of the pivotal connection lying parallel to an axis of the pipe, wherein each component of the flexible composite carriage comprises a group of at least two coaxial supporting rollers, an axis of which is situated at a distance from the pivotal connection that is less than or equal to ⅓ of a distance between hinges of the components and is parallel to the axis of the pipe, and wherein the components of the flexible composite carriage are connected to each other in series in such a way that each component bears on two groups of supporting rollers-one of which is mounted on the component itself, and the other is mounted on an adjacent component, and one of two end components of the carriage bears on an additional group of supporting rollers installed on the said component or on the clamping device as an open chain of individual links, and wherein at least one component of the flexible composite carriage is equipped with a supporting-driven roller and a drive mechanism with a torque source configured to move the flexible composite carriage along the pipe surface around its axis by means of driven rollers, and wherein at least one component of the flexible composite carriage has at least one functional unit for pipe processing.

In one particular embodiment of the claimed technical solution the clamping device is made in the form of flexible open chain of individual links with both ends connected to the carriage end components, and the chain links are equipped with supporting rollers, wherein at least one connection of the chain and flexible composite carriage is detachable and movable, and at least one component of the flexible composite carriage is equipped with tensioning mechanism ensuring the required hold-down pressure of the flexible composite carriage to the pipe outer surface by means of tensioning element in the form of flexible open chain with ability to control hold-down pressure by means of an elastic element.

In another particular embodiment of the claimed technical solution the counterweights are additionally installed on the clamping device.

In the particular embodiment of the claimed technical solution the clamping device is made in the form of flexible closed chain of individual links or flexible band configured to enclose the pipe and flexible composite carriage installed on it, provided that, the clamping device has at least one detachable link and at least one component of the flexible composite carriage is equipped with tensioning mechanism ensuring the required hold-down pressure of the flexible composite carriage to the pipe outer surface by means of tensioning element in the form of flexible closed chain with ability to control hold-down pressure by means of an elastic element.

In the particular embodiment of the claimed technical solution the components of the flexible composite carriage additionally comprise as follows: upper rollers or chain sprockets positioned in top corners of the flexible composite carriage components; side rollers or chain sprockets positioned on side surfaces of the flexible composite carriage components, provided that, when implementing the clamping device in the form of flexible metal band the additional chain sprockets are installed in the end flexible composite carriage components, and the chain bends round these sprockets passing between the said chain sprocket and pipe outer surface.

In the particular embodiment of the claimed technical solution the clamping device is made as a system of magnets installed in the flexible composite carriage components and equipped with a mechanical system changing the attractive force between magnets and processed steel pipe by changing the magnets position relative to steel pipe surface.

In the particular embodiment of the claimed technical solution the torque source of the flexible composite carriage drive mechanism is an electric motor, hydraulic motor or air motor.

In the particular embodiment of the claimed technical solution the elastic element of the tensioning mechanism is configured to control tension force of the clamping device in the form of spring system or pneumatic cylinder or pneumatic muscle.

In the particular embodiment of the claimed technical solution the functional unit for pipe processing is made in the form of welding torch MIG/MAG or TIG welding and a mechanism of its movement or in the form of cutting head of gas-flame or plasma cutting and a mechanism of its movement or in the form of a milling cutter with drive and a mechanism of its movement; or in the form of diagnostic device and a mechanism of its movement.

The advantage of the claimed embodiment is that it makes spiral motion impossible at working travel of the device around the pipe axis, and the device does not require installation of the guiding ring or guiding template, that among other things simplifies the procedure of the device installation on the pipe and reduces time for such installation. Use of pneumatic tensioning system also enables to reduce time for device installation/dismantling on/from the pipe, exception of the guiding ring, separation of the device into different components enables to reduce the device dimensions in radial and axial direction, installation of counterweights almost completely excludes device slipping when moving at vertical areas, the device structure enables to install one or several functional units of various applications-welding, cutting, bevelling, etc.

BRIEF DESCRIPTION OF THE DRAWINGS

Details, features, and also advantages of the present invention come from the below description of the embodiments of the claimed technical solution using the drawings illustrating as follows:

The following items are specified in figures:
1—pipe; 2—carriage component equipped with tensioning mechanism; 3—carriage component equipped with welding torch (14) and its movement and positioning mechanisms; 4—carriage component equipped with drive mechanism, 5—pivotal connection of the flexible composite carriage components; 6—supporting rollers; 7—supporting-driven rollers; 8—elements of the clamping device; 9—shafts connecting two elements of the clamping device; 10—supporting rollers of the clamping device; 11—nondetachable connection of the clamping device and carriage; 12—hooks installed on the carriage component 2; 13—shaft installed on the flexible tensioning element for engaging the hook 12; 14—welding torch; 15—video cameras; 16—clamping device in the form of metal chain or band; 17—upper rollers or chain sprockets; 18—side rollers or chain sprockets; 19—pipe (1) section enclosed by the clamping device 16; 20—pipe (1) section not enclosed by the clamping device 16; 21—detachable connection of the clamping device 16; 22—plasmatron; 23—flexible composite carriage component without tensioning and drive mechanisms, not equipped with a functional unit; 24—magnetic supporting roller, 25—cam, 26—lever; 27—magnet, 28—holder of magnet 27; 29—shaft; 30—lever; 31—magnet, 32—holder of magnet 31; 33—eccentric; 34—lever of eccentric 33.

DETAILED DESCRIPTION OF THE INVENTION

Device for orbital processing of pipe ends and non-rotating butt joints movable around the processed pipe is made as flexible composite carriage installed on the pipe outer surface and consisting of two and more components pivotally connected with each other and a clamping device.

Pivotal connection of the carriage components ensures turning of two adjacent carriage components only around the pivot pin parallel to the processed pipe axis.

Each component of the flexible composite carriage comprises a group of at least two coaxial supporting rollers for resting on the pipe outer surface. Shaft of the supporting rollers is located from the pivotal connection at no more than ⅓ of the distance between the component pivots and is parallel to the processed pipe axis. The components of the flexible composite carriage are connected to each other in series in one order so that each component is rested on two groups of supporting rollers-one of which is installed on the component itself, and the second one-on the adjacent one, and one of two end components of the carriage is rested on the additional group of supporting rollers which can be installed as on the component itself as on the clamping device made in this embodiment of the claimed technical solution as flexible open chain of individual links.

Positioning of the components with such location of the supporting rollers shaft ensures at series connection in one order a stable structure when each component being subjected to hold-down pressure stably rests on two groups of supporting rollers-one of which is positioned on the component under examination and the second one-on the adjacent component. In the limiting case, when the axis of the supporting rollers group is located in the middle, unstable structure is formed between the component pivots-when changing a position of one component, for example, at running the supporting rollers over the pipe longitudinal weld, the position of all the other components is also changed. However, the closer axis of the supporting rollers to the component pivot, the smaller is deviation of the adjacent component-according to the lever effect. Thus, if the shafts of the supporting rollers and pivots are aligned, change of the one component position does not affect the position of the adjacent component.

The clamping device can be embodied by three methods:
as open chain of individual links, the ends of such chain are connected to the end carriage components and rotates together with the carriage around the pipe during the device operation. In such embodiment the enclosing clamping device is flexible. The chain links are equipped with rollers to reduce friction. At least one connection of the chain and flexible composite carriage is detachable, for example in the form of a hook—for ease of device removal/installation from/on the pipe. The connections of the clamping device and the carriage are movable. The flexible composite carriage and such flexible clamping device enclose the pipe circumferentially;
as closed chain of individual links or flexible band, such clamping device encloses the pipe and the flexible composite carriage installed on it. In such embodiment the enclosing clamping device is flexible, provided that, the flexible clamping device does not rotate around the pipe, installation of rollers on the flexible clamping device for friction force reduction is not required, it is possible to install two and more flexible composite carriages, moving independently of one another, with one flexible clamping device. If an apparatus for welding pipes is used, the flexible clamping device is made with at least one detachable link to remove the tensioning element after pipe butt welding;
as a system of magnets installed in the flexible composite carriage components and equipped with a mechanical system changing the attractive force between magnets and processed steel pipe of high magnetic conductance by changing the magnets position relative to steel pipe surface. Quantity and position of magnets are selected so that each group of supporting and supporting-driven rollers of the flexible composite carriage is subjected to the required force of pressing to the pipe. The clamping device from the magnet system has two positions: installation position, at which the attractive force between magnets and steel pipe is minimal and it is possible to install/remove the device on/from the pipe; working position, at which the attractive force between magnets and steel pipe is selected so that the friction force between the pipe outer surface and driven rollers exceeds the force on the outer surface of the driven rollers required to put the device in motion around the pipe axis in all areas of the flexible composite carriage movement, and exceeds gravity force acting on the flexible composite carriage components, thereby excluding detachment of the flexible composite carriage when moving in the pipe lower part.

Such clamping device enables to install several assembled carriages movable independently of one another, except for collision.

At least one component of the carriage is equipped with a drive mechanism with a torque source, e.g. electric motor, moving the flexible composite carriage on the pipe surface around its axis by means of driven rollers. When using the enclosing tensioning element in the form of closed or open chain, at least one carriage component is equipped with a tensioning mechanism ensuring the required hold-down pressure of the flexible composite carriage to the pipe outer surface with ability to control hold-down pressure by means of an elastic element, for example, spring system. At least one carriage component is made with at least one of the following functional units:
welding torch MIG/MAG or TIG welding and mechanisms of its movement;

cutting head of gas-flame or plasma cutting and mechanisms of its movement;

milling cutter with drive and mechanisms of its movement;

diagnostic device and mechanisms of its movement.

The given list is not limited to the above functional units.

Sequence of components arrangement in the flexible composite carriage could be different.

The distinctive feature of the device is the flexible composite carriage resting directly on the pipe surface and consisting of two and more components pivotally connected with each other. Each carriage component comprises a group of at least two coaxial supporting rollers configured to rest on the pipe outer surface, the components are connected to each other in series in one order so that each component is rested on two groups of supporting rollers-one of which is installed on the component itself, and the second one-on the adjacent component, and one of two end components of the carriage is rested on the additional group of supporting rollers which can be installed as on the component itself as on the clamping device made as flexible open chain. Pivotal connection of the carriage components ensures turning of two adjacent carriage components only around the pivot pin parallel to the welded pipe axis. Such carriage structure enables to achieve several technical results:

flexible composite carriage consisting of at least two components, installed on the pipe outer surface, enclosing the pipe circumferentially, comprising at least three groups of supporting rollers and pressed to the pipe surface by the clamping device, moves on the pipe as in a guide even if the pipe has geometric imperfections, such as longitudinal weld, minor indentations and dimples, ovality, conicity, metal splashes. Therefore, there is no necessity in using fixed guiding ring or guiding template, that in turn considerably simplifies the procedure of the device installation on the pipe—i.e. exact positioning of the guiding ring or guiding template on the processed pipe is not required;

pivotal connection of the carriage components makes it possible to install one and the same carriage on different pipeline diameters, it is required only to select length and type of the clamping device depending on the processed pipe diameter;

the carriage structure made of several pivotally connected components enables to allocate all necessary assemblies and units of the carriage on several components by increasing the length of the flexible composite carriage circumferentially, but at the same time reducing its sizes in radial direction and along the pipe axis—that enables to process butt joints and pipe edges in confined spaces and on preinsulated pipelines;

the carriage components can comprise different functional units-welding torch, plasmatron, beveling machine, diagnostic device.

Therefore, the device can be used for different operations-pipe butt welding, build-up welding, pipe cutting, pipe edge beveling, diagnostics of metal and circular welds;

when using the clamping device in the form of open chain with both ends connected to the flexible composite carriage and movable together with it on the pipe surface around its axis, it is possible to install counterweights on the clamping device—that reduced load on the drive mechanism and supporting-driven rollers, and reduces the likelihood of slipping on vertical sections.

Figure 1:
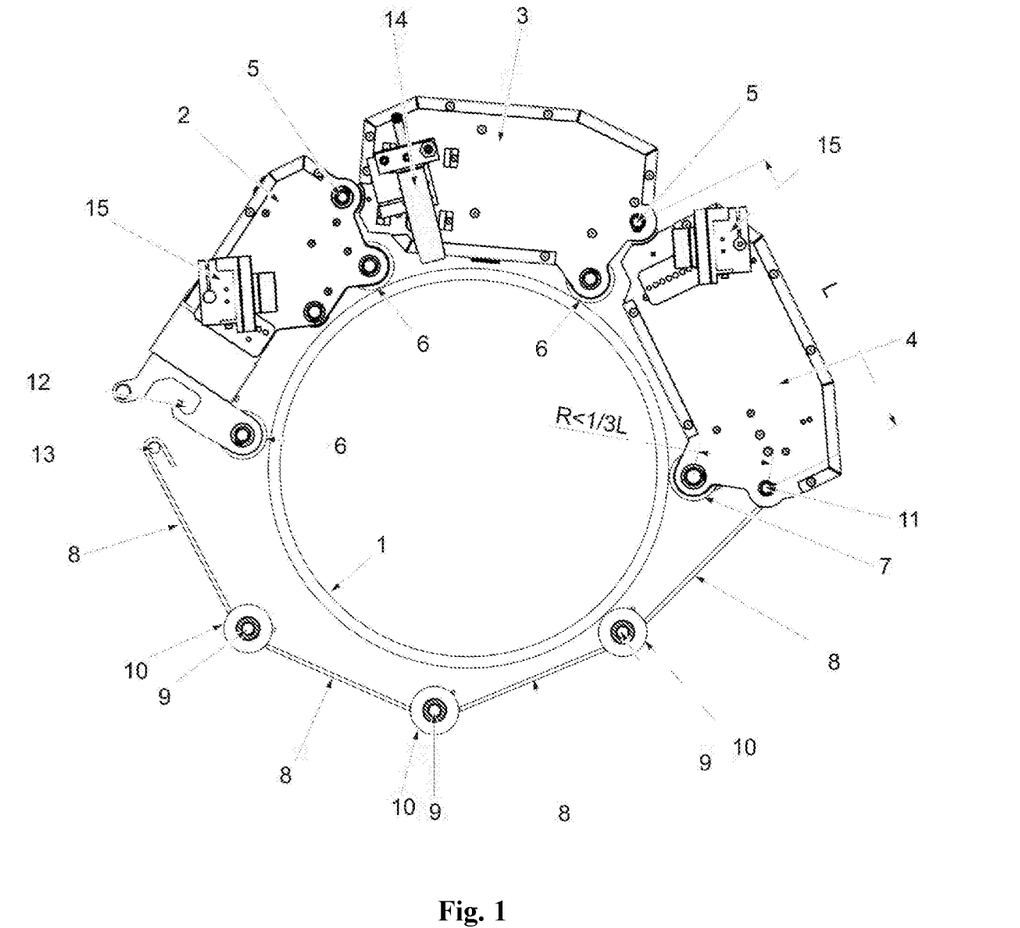
FIG. 1—the device in the open condition installed around the pipe.

FIG. 1 illustrates an assembled carriage consisting of three pivotally connected components—(2, 3 and 4). The components are connected with each other by pivots (5).

Each of components (3 and 4) has one group of at least two coaxial supporting rollers (6) and supporting-driven rollers (7).

The component (2) has two groups of the supporting rollers (6). The clamping device is made in the form of individual links (8), connected with each other by shafts (9), each link (8) is equipped with a supporting roller (10) to reduce friction. Both ends of the clamping device are attached to the carriage by means of shaft (11) and detachable connection in the form of a hook (12) and shaft (13) engaged by the hook (12). The detachable connection can be made by the other method—in the form of a shaft running through the eyes installed on the carriage component and link of the clamping device in the form of hooks and hooked eyes or openings.

The component (2) is equipped with a tensioning mechanism (not shown in FIG. 1) by means of which the length of the component (2) between the pivot (5) and the hook (12) is changed. Increasing the length of the component (2) between the pivot (5) and the hook (12) makes it possible to open and close the detachable connection. The tensioning mechanism is equipped with an elastic element in the form of a spring, pneumatic cylinder or pneumatic muscle, so that when decreasing the length of the component (2) between pivot (5) and hook (12), with the closed detachable connection of the flexible composite carriage and clamping device, it is ensured holding-down of the supporting rollers (6) and supporting-driven rollers (7) and increasing the potential energy of spring, pneumatic cylinder or pneumatic muscle with ability to control tension force of the clamping device.

Welding torch (14) for gas-shielded welding and drive mechanisms (not shown) for the welding torch (14) movement and positioning are installed on the component (3). One or several functional units can be installed on the carriage component. It could be a welding torch for gas-shielded welding by consumable or nonconsumable electrode, plasma-arc welding torch, flame cutter, plasmatron, torque source in the form of electric motor, hydraulic motor or air motor and milling cutter for edge milling or pipe cutting, ultrasonic flaw detector. Generally, in addition to the functional unit itself there are required the mechanisms of its positioning and movement along the pipe axis, in radial direction and changing a slope angle relative to the pipe (1) surface. Depending on type and quantity of functional units the assembled carriage can have different functionality, including multifunctionality.

The component (4) comprises a torque source in the form of electric motor, hydraulic motor or air motor from which the torque is transmitted to the supporting-driven rollers (7) and the assembled carriage is moved on the pipe (1) surface around its axis.

For processing observation convenience, the components (2 and 4) of the assembled carriage are equipped with video cameras (15) transmitting an image to the device operator display.

The device is installed on the processed pipe as follows:

The flexible composite carriage, comprising the components (2, 3 and 4), connected by the shaft (11) clamping device of links (8) connected by shafts (9) and equipped with rollers (9) with an open connection consisting of a hook (12) and shaft (13) of the clamping device, is installed on the outer surface of the pipe (1). The tensioning mechanism of the component (2) is slackened. The flexible composite carriage and clamping device enclose the pipe (1). The shaft (13) engages the hook (12) and the length of the component (2) between the pivot (5) and the hook (12) is reduced by controlling the tensioning mechanism until all the groups of supporting rollers (6) and (10) and supporting-driven rollers (7) touch the pipe (1) outer surface, after that the tensioning mechanism potential energy is controlled.

Potential energy for the spring tensioning mechanism is controlled by compressing the spring to a certain value or with certain force, for pneumatic cylinder or pneumatic muscle—the component (2) length between the pivot (5) and the hook (12) is reduced and potential energy is controlled by compressed air supply to the pneumatic elastic element pressure space and by air pressure control in the pneumatic elastic element pressure space.

The device is removed from the pipe (1) after its processing in reverse order:—slackening the elastic element of the tension mechanism, increasing the length of the component (2) between the pivot (5) and the hook (12) to the value sufficient for detaching the connection of the hook (12) and the shaft (13), detaching of the connection, removal of the device from the pipe (1).

When the device is in operation and rotates around the pipe (1) axis, there is possible a situation when one or several supporting rollers (6, 10) or supporting-driven rollers (7) run over a local geometric imperfection of the pipe (1) surface, such as longitudinal weld, ovality, conicity, minor ovality or convexity, metal splashes, etc., while the length of the component (2) between the pivot (5) and the hook (12) is changed compensating the change of the device length, and the required hold-down pressure of the supporting rollers (6, 10) and supporting-driven rollers (7) to the pipe (1) surface is maintained due to potential energy of the elastic element.

Location of the shaft of the supporting rollers (6) and supporting-driven rollers (7) at the distance from the pivotal connection that is less than or equal to ⅓ distance between the component pivots enables to change the distance from the pipe surface to the pin of only one connection in the form of pivots (5) or connections of the flexible clamping device and carriage in case of running over the supporting rollers (6) or supporting-driven rollers (7). Provided that, the less the distance from the shaft of the supporting rollers (6) or supporting-driven rollers (7) to the pivot, the smaller the change of the length of the component with tensioning mechanism at running the rollers (6 and 7) over the local geometric imperfection area, and thus, it is easier to maintain the required tension force of the clamping device.

The tension force of the clamping device is selected so that the friction force between the pipe outer surface and driven rollers exceeds the force on the outer surface of the driven rollers required to put the device in motion around the pipe axis in all areas of the flexible composite carriage movement.

The advantage of the claimed technical solution is the ability of the device to move strictly around the pipe axis, excluding spiral motion without a guiding ring or guiding template even in case of local geometric imperfections of the processed pipe.

The factors defining the ability of the assembled carriage to move strictly around the pipe axis, excluding spiral motion are as follows:
- torsional rigidity of the carriage components around the axis perpendicular to pivot (5) pins and passing through them;
- angle with the vertex on the pipe axis formed by two arms passing through two end shafts of supporting or supporting-driven rollers of the assembled carriage;
- hold-down pressure of the flexible composite carriage to pipe surface;
- outer track width of the supporting rollers (6) and supporting-driven rollers (7);
- quantity of supporting rollers (6) and supporting-driven rollers (7) shafts actually equals to the quantity of the flexible composite carriage components plus one shaft.

All the above factors are interdependent.

When one roller of the carriage component runs over the local geometric imperfection area under hold-down pressure of the clamping device, torsional twisting of such carriage component around the axis perpendicular to pivot (5) pins and passing through them is possible. Therefore, the shaft of the supporting rollers (6) or supporting-driven rollers (7) of such carriage component loses parallelism of the pipe axis and deviation of the device motion trajectory is possible. The more torsional rigidity of the carriage components the higher hold-down pressure of the clamping device such component can take up without torsional twisting and trajectory deviation. The higher hold-down pressure of the clamping device the more difficult is to deviate the flexible composite carriage to spiral motion—the more apparent is levelling effect on the pipe. The more components and, correspondingly, shafts of the groups of the supporting rollers (6) or supporting-driven rollers (7) the flexible composite carriage has, the less is a probability that a considerable part of rollers is in the pipe local geometric imperfection areas. For the device in FIG. 1, when rollers of one of the components run over the local geometric imperfection area, the other rollers will contact the pipe (1) outer surface without defects and sustain rectilinear motion. When in operation, the flexible composite carriage successively passes the local geometric imperfection areas, and the carriage adjacent components will slightly rotate relative to each other around the pin of the pivot (5) connecting them, while maintaining the required hold-down pressure of all the supporting rollers (6) and supporting-driven rollers (7) to the pipe (1) outer surface.

The more angle with the vertex on the processed pipe (1) axis formed by two arms passing through two end shafts of the supporting rollers groups of the flexible composite carriage and the wider the outer track of the supporting rollers (6) and supporting-driven rollers (7), the more force is required to deviate the flexible composite carriage, pressed by clamping device to the pipe (1) surface, to spiral motion.

Figure 2:
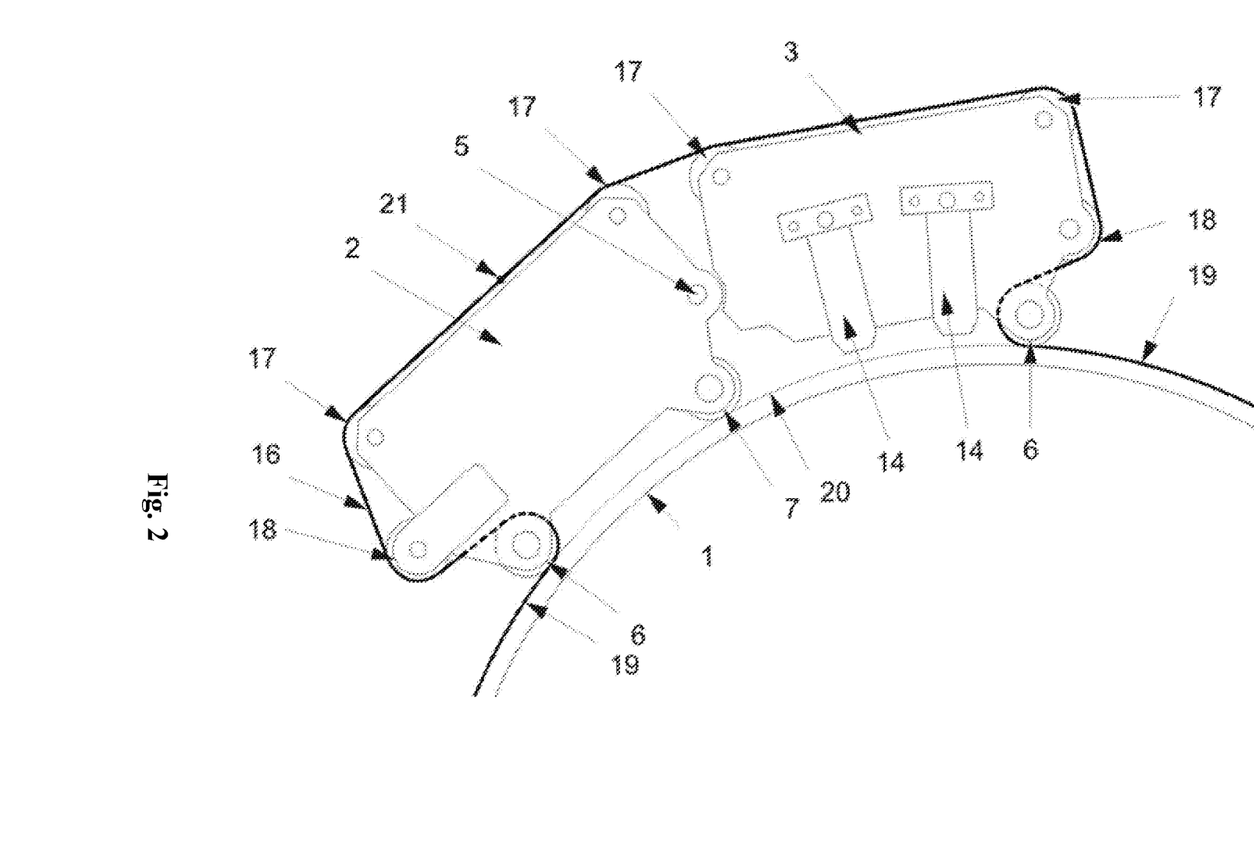
FIG. 2—the device installed on the pipe with enclosing flexible clamping device.

FIG. 2 illustrates an flexible composite carriage consisting of two pivotally connected components-(2 and 3). The components are connected with each other by the pivot (5). The component (3) has one group of at least two coaxial supporting rollers (6). The component (2) has two groups of the supporting rollers (6) and supporting-driven rollers (7). The clamping device (16) is a metal chain or closed metal band with at least one lock connection (21). The clamping device (16) encloses the pipe (1) and a carriage installed on it. The clamping device (16) bends round the carriage over the upper rollers (17), side rollers (18) and passes under the end supporting rollers (6) of the carriage. If the clamping device (16) is in the form of metal chain, the upper rollers (17) and side rollers (18) can be replaced by chain sprockets, and additional chain sprockets are installed on the end components of the flexible composite carriage; the chain bends round these sprockets passing between such chain sprocket and pipe outer surface. The pipe (1) with the installed device has sections covered by the clamping device (16)-(19) and sections not covered by the clamping device (16-20).

The component (2) is equipped with a tensioning mechanism (not shown in FIG. 2) which is used to change the distance between shafts of rollers or chain sprockets, which the clamping device (16) bends round, and to tension or slacken the clamping device (16) and to hold down the supporting rollers (6) and supporting-driven rollers (7).

The tensioning mechanism is equipped with an elastic element in the form of a spring, pneumatic cylinder or pneumatic muscle to maintain the required tension of the clamping device (16) when the carriage passes through the local geometric imperfection areas of the pipe (1).

Two welding torches (14) for gas-shielded welding and drive mechanisms (not shown) for moving and positioning the welding torches (14) are installed on the component (3).

The component (2) comprises a torque source in the form of electric motor, hydraulic motor or air motor from which the torque is transmitted to the shaft with supporting-driven rollers (7) and the flexible composite carriage is moved on the pipe (1) surface around its axis. A torque from the torque source can be transmitted to any roller or chain sprocket of the component (2), and such solution will enable carriage movement around the processed pipe (1), however, the most optimal solution is torque transmission just to the rollers (7), since they directly contact the processed pipe outer surface, and they can be coated with rubber or silicone or other similar coating and ensure friction coefficient 0.6-0.8, while friction coefficient between the pipe outer surface and metal clamping device is within the range of 0.15-0.3, that requires increasing of the clamping device tension force to transmit the required torque especially when the carriage passes along vertical sections. More complex structure is possible, when a torque from the torque source is simultaneously transmitted to the supporting-driven rollers (7) and to any other rollers or chain sprockets of the component (2).

The device is installed on the processed pipe (1) as follows:

The carriage assembled of the components (2 and 3), with the clamping device (16) installed on it, is installed on the pipe (1). The tensioning mechanism of the component (2) is slackened. The clamping device (16) is locked by a lock (21) and the distance between the shafts of the component (2) rollers, which the clamping device (16) bends round is changed until all the groups of the carriage supporting (6) and supporting-driven rollers (7) touch the pipe (1) outer surface, after that the clamping device (16) tension force is controlled. The clamping device (16) tension force is controlled in a similar manner to the device with the clamping device in the form of a chain of individual links attached to the flexible composite carriage.

The device is removed from the pipe (1) after its processing in reverse order:—slackening the elastic element of the tension mechanism, changing center to center distance of the rollers enclosed by the tensioning element (16) of the component with tensioning mechanism to the value sufficient for detaching the connection (21), detaching of the connection (21) removal of the device from the pipe (1).

Figure 3:
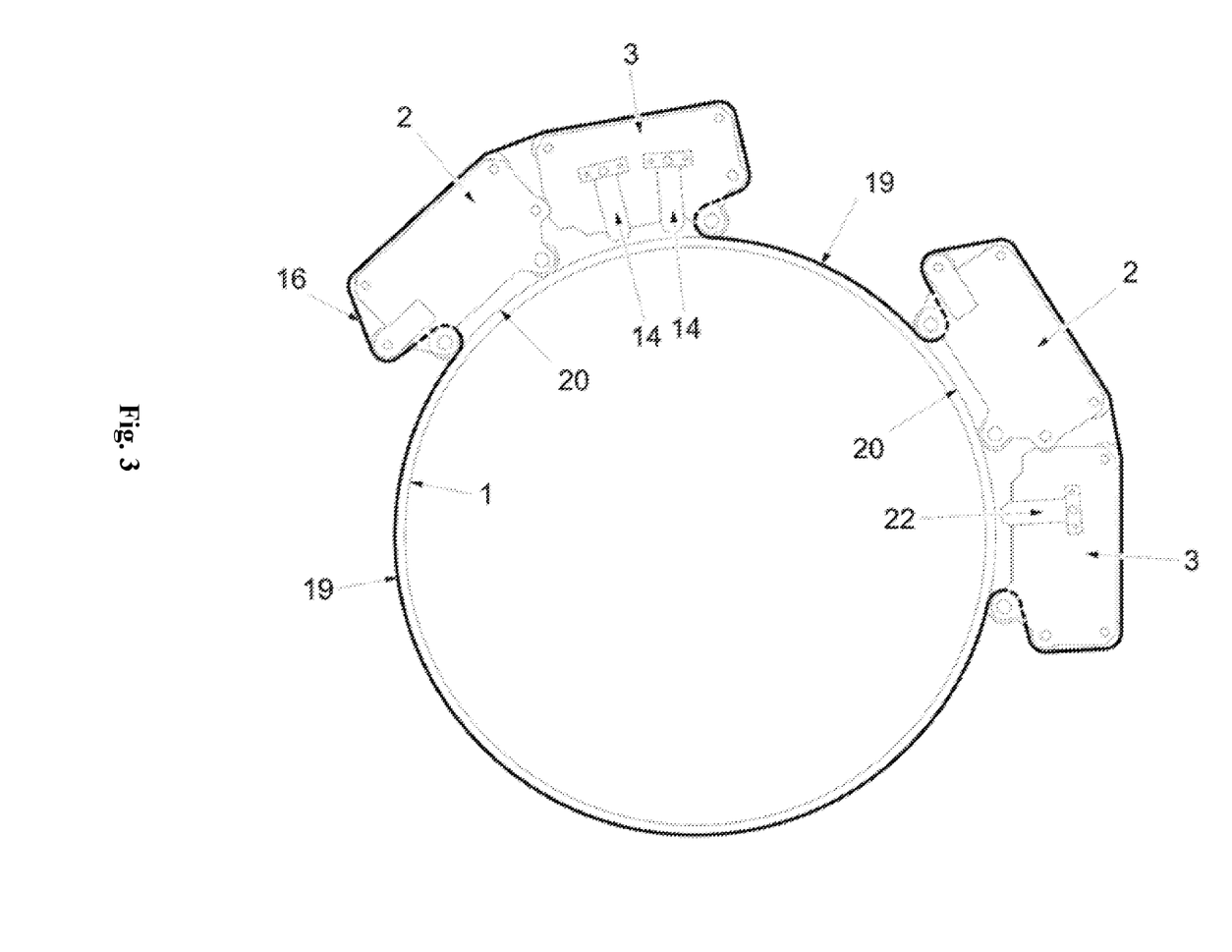
FIG. 3—two flexible composite carriages installed on the pipe under one enclosing clamping device.

If the clamping device is in the form of flexible metal chain or band enclosing the pipe with the flexible composite carriage installed on it, it is possible to install several flexible composite carriages under one enclosing clamping device (16)—see FIG. 3. Provided that, each carriage can move independently of the others, except for possible collision. One of the carriages shown in FIG. 3 is equipped with two welding heads (14) and their movement and positioning mechanisms, the other one—with plasmatron (22) and its movement and positioning mechanisms.

Functional unit positioning mechanisms are required to position the functional unit relative to the pipe section surface. Functional unit movement mechanisms are used to move or rotate the functional unit relative to the pipe section surface during the device operation. Movement mechanisms in contrast with positioning mechanisms are equipped with power sources of linear or circumferential movement.

Functional unit linear movement mechanisms can be made as linear or lever guiding elements and mechanical transmissions such as bolt-nut, gear rack-pinion gear, belt gear, toothed belt gear, rope and roller system, and are equipped with a torque source-electric motor, hydraulic motor or air motor. Also, linear movement mechanism can be made as linear pulse motor, pneumatic drive or pneumatic muscle or hydraulic drive-in this case no torque source is required.

Rotation mechanisms can be made as a torque source-electric motor, hydraulic motor or air motor, and can be equipped with a mechanical reduction gear for torque increasing.

The flexible composite carriage component with a welding torch for gas-shielded welding is equipped with a mechanism of torch movement along the pipe axis, mechanism of welding torch height positioning relative to pipe surface in radial direction, mechanism of torch slope angle positioning in the butt joint plane. For the purpose of welding quality improvement the component with a welding torch can be equipped with a rotation mechanism changing the welding torch slope angle in the butt joint plane and with a mechanism of torch height positioning relative to pipe surface in radial direction.

The component with plasma or flame cutter is equipped with mechanisms of cutter positioning along the pipe axis, height positioning relative to pipe surface and cutter slope angle positioning in the plane perpendicular to the butt joint plane and passing through the cutter axis. For the purpose of plasma cutter lifetime improvement the component with such cutter is equipped with a mechanism of the cutter height movement relative to the pipe section surface, and when burning through the pipe at the beginning of cutting the cutter height is increased for a short period followed by its decrease to a working value.

The component with a milling cutter is equipped with mechanisms of milling cutter positioning along the pipe axis, height positioning relative to pipe surface and milling cutter slope angle positioning in the plane perpendicular to the butt joint plane and passing through the milling cutter axis. For the sake of convenience, when processing the pipe within several passes, the component with a milling cutter can be equipped with a mechanism of the milling cutter height movement relative to the pipe section surface.

Equipping the component with a diagnostic device with positioning and movement mechanisms is defined by the diagnostic device type and structure.

Figure 4:
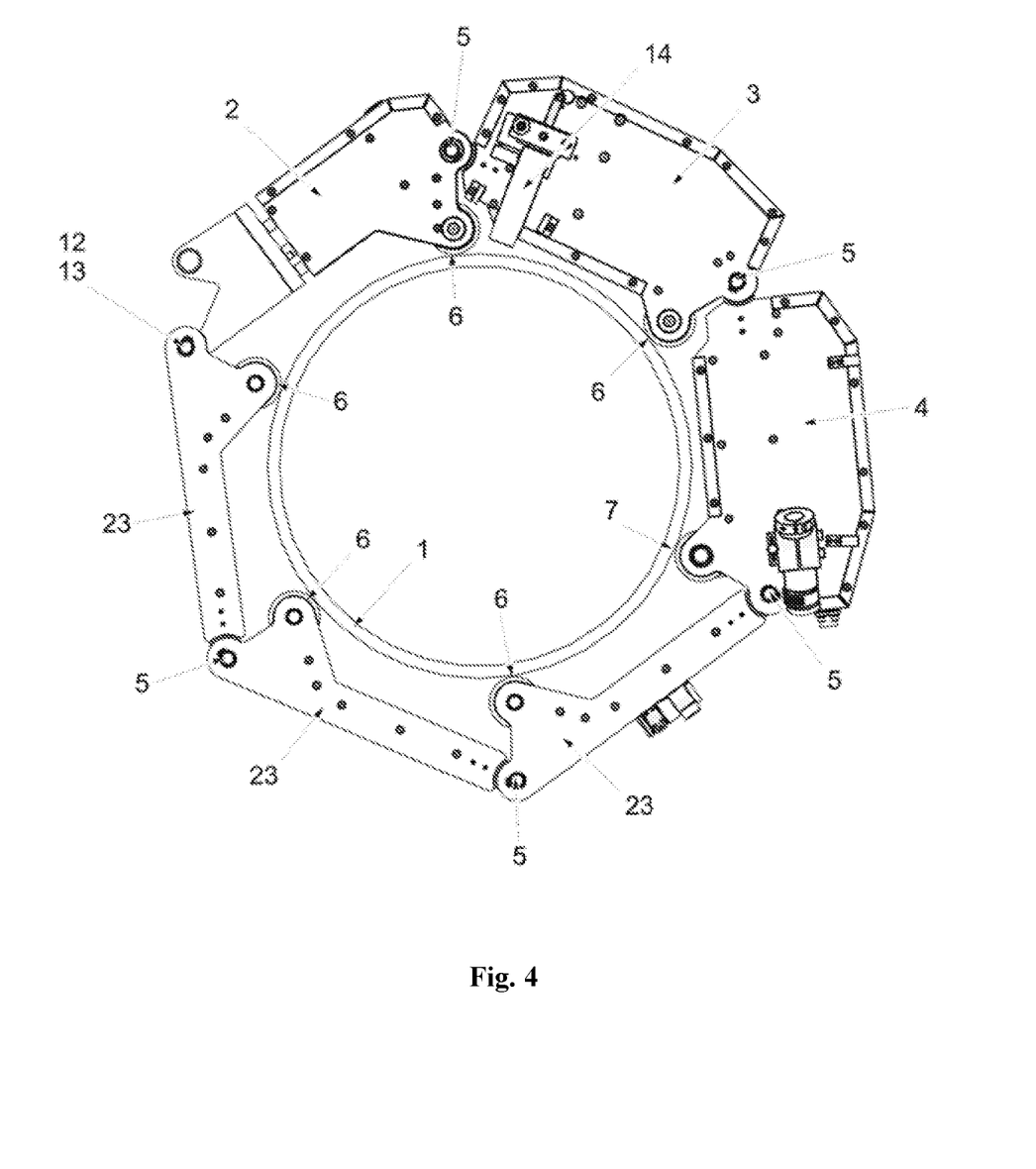
FIG. 4—the device without flexible clamping device.

In some cases, the length of the flexible composite carriage could be sufficient for enclosing the assembled carriage around pipe, excluding the tensioning element, see FIG. 4. The flexible composite carriage in FIG. 4 consists of 6 components—(2, 3, 4 and 23). The component (2) is equipped with a tensioning mechanism, the component (3)—with welding torch (14) and its movement and positioning mechanisms, the component (4)—with a drive mechanism transmitting a torque from the torque source to the supporting-driven rollers (7). The device is not equipped with a clamping device and encloses the pipe circumferentially, pivotal connection of the components—(2 and 23) is detachable in the form of hooks (12) installed on the component (2) and the shaft (13) installed on the component (23).

Technically, the clamping device in the form of a system of magnets installed in the flexible composite carriage components and equipped with a mechanical system changing the attractive force between magnets and processed steel pipe of high magnetic conductance can be implemented in the following embodiments:

supporting rollers of the flexible composite carriage are made of magnetic material and rest on the steel pipe outer surface. Distance between magnet and steel pipe is changed by slight lifting the flexible composite carriage component, on which a magnet roller is installed, above the steel pipe surface by means of a cam or eccentric, or wedge, or pneumatic or hydraulic cylinder, or pneumatic muscle or mechanical transmission such as bolt-nut or gear rack.

magnet in the form of rectangular block or disc, or cylinder is fixed on the flexible composite carriage component at a distance from the processed pipe surface, at which the required hold-down pressure is ensured. Distance between magnet and steel pipe is changed by slight lifting the flexible composite carriage component, on which a magnet is fixed, above the steel pipe surface by means of a cam or eccentric, or wedge, or pneumatic or hydraulic cylinder, or pneumatic muscle or mechanical transmission such as bolt-nut or gear rack.

magnet in the form of rectangular block or disc, or cylinder has a movable connection with the flexible composite carriage component and is configured to rotate around axis not aligned with the magnet axis.

The attractive force is changed by magnet rotation around such axis not aligned with the magnet axis. The magnet can be rotated by rotation of a shaft on which the magnet is fixed, by magnet rotation around the fixed shaft by means of lever or pusher, or pneumatic or hydraulic cylinder, or pneumatic muscle, or electric actuator, by torque transmission from electric motor, air motor or hydraulic motor.

magnet in the form of rectangular block or disc, or cylinder has a movable connection with the flexible composite carriage component and is configured to move linearly relative to the flexible composite carriage component, on which the magnet is installed so that the distance from steel pipe to the magnet is changed. Magnet can be moved by lever system or eccentric, or wedge, or pneumatic or hydraulic cylinder, or pneumatic muscle or mechanical transmission such as bolt-nut or gear rack.

Quantity and position of magnets are selected so that each group of supporting and/or supporting-driven rollers of the flexible composite carriage is subjected to the force of pressing to the pipe.

Several embodiments of the magnet system-based clamping device can be implemented in one flexible composite carriage.

For the purpose of environmental protection, a magnet can be coated by the protective shell made of steel, polymer material, rubber or silicone.

Figure 5:
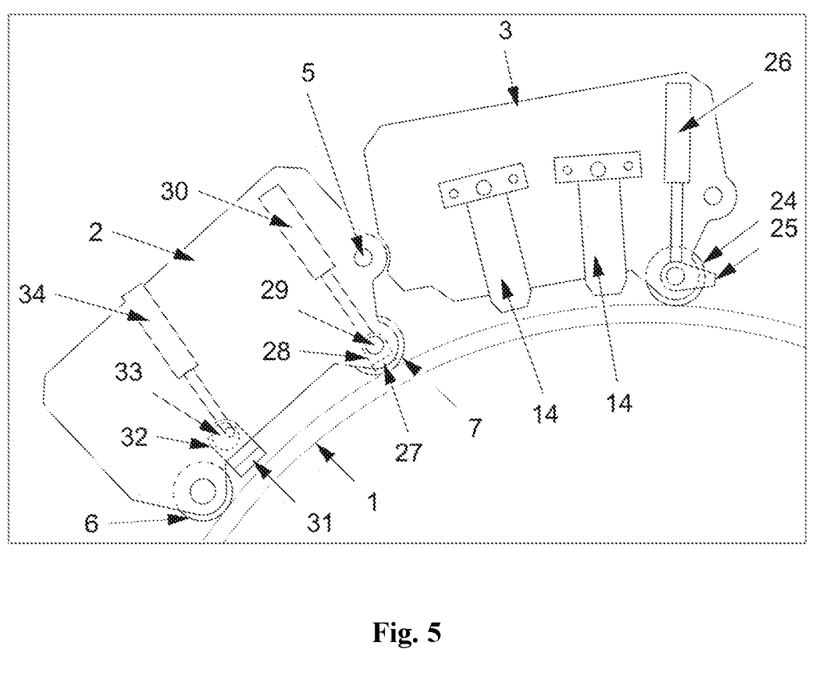
FIG. 5—the device with magnetic clamping device.

FIG. 5 illustrates a flexible composite carriage consisting of two pivotally connected components—(2 and 3). The components are connected with each other by the pivot (5). The clamping device is made as a system of magnets equipped with a mechanical system changing the attractive force between magnets and processed steel pipe of high magnetic conductance by changing the magnets position relative to steel pipe surface. When increasing the distance passed by magnetic field in air with low magnetic permeability, the attractive force between magnet and steel pipe is reduced.

FIG. 5 illustrates several possible embodiments of magnets on one flexible composite carriage—roller and fixed magnets, mechanical systems changing attractive force between magnets and steel pipe—in the form of a cam, eccentric and fixing the magnet configured to rotate around axis not aligned with the magnet axis.

The roller (24) of the flexible composite carriage is magnetic. The component (3) is equipped with the cam (25) and the lever (26) connected with it to change the distance between the pipe (1) and magnetic roller (24) and to reduce the attractive force between the magnetic roller (24) and the pipe (1). With lever (26) clockwise rotation the cam (25) bumps into the pipe (1) and slightly lifts the component (3) above the pipe surface.

The component (2) has two magnets (27) and (31). The magnet (27) is installed into the magnet holder (28) configured to rotate around shaft (29). The magnet holder (28) with the magnet (27) is rotated around the shaft (29) by means of the lever (30). When the lever (30) rotates clockwise or counterclockwise, the distance passed by magnetic field in air is changed, and the attractive force between the magnet (27) and the pipe (1) is changed correspondingly. Rotary shaft (29) can align with the shaft of the group of supporting rollers (6) or supporting-driven rollers (7).

The magnet (31) is fixed in the magnet holder (32) equipped with the eccentric (33). When the lever (34) rotates, the magnet holder (32) is displaced, and the distance between the magnet (32) and the pipe (1) is changed.

The assembled carriage comprising the components (2, 3) is installed on the pipe (1) as follows. The magnets (24, 27, 31) are in the state of the least attractive force to the steel pipe (1). The device is installed on the pipe (1) and the magnets (24, 27, 31) are put into position, ensuring the required attractive force between the magnets (24,27,31) and the pipe (1), by means of the levers (26, 30, 34).

The device is removed from the pipe (1) in reverse order:

For the purpose of increasing the attractive force the magnets of the clamping device can be equipped with open magnetic conductor made of high magnetic permeability material, for example, steel, ferrite or perm-alloy facing the pipe (1) with its open part and forming the magnetic circuit—magnetic conductor—pipe with at least two air gaps.

The invention claimed is:

1. A device for orbital processing of ends and non-rotating butt joints of a pipe configured for installation and movement around an outer surface of the pipe and comprising a clamping device and a flexible composite carriage, the flexible composite carriage consisting of at least two carriage components joined together via a pivotal connection and configured to pivot only around a pivot pin of the pivotal connection lying parallel to an axis of the pipe, wherein each carriage component of the flexible composite carriage comprises a group of at least two coaxial supporting rollers, an axis of which is situated at a distance from the pivotal connection that is less than or equal to ⅓ of a distance between hinges of the carriage components and is parallel to the axis of the pipe, and wherein the carriage components of the flexible composite carriage are connected to each other in series in such a way that each carriage component bears on two groups of supporting rollers-one of which is mounted on the carriage component itself, and the other is mounted on an adjacent carriage component, and one of two end carriage components of the flexible composite carriage bears on an additional group of supporting rollers installed on the said carriage component or on the clamping device as an open chain of individual links, and wherein at least one carriage component of the flexible composite carriage is equipped with a supporting-driven roller and a drive mechanism with a torque source configured to move the flexible composite carriage along the pipe surface around its axis by means of driven rollers, and wherein at least one carriage component of the flexible composite carriage has at least one functional unit for pipe processing.

2. The device according to claim 1, wherein the clamping device is made as a flexible open chain of individual links with both ends connected to the end carriage components of the flexible composite carriage, and the chain links are equipped with supporting rollers, wherein at least one connection of the chain and flexible composite carriage is detachable and movable, and at least one carriage component of the flexible composite carriage is equipped with a tensioning mechanism that ensures a required hold-down pressure of the flexible composite carriage to the pipe outer surface by means of the clamping device and is configured to control the hold-down pressure by means of an elastic element.

3. The device according to claim 2, wherein counterweights are additionally installed on the clamping device.

4. The device according to claim 1, wherein the clamping device is made as a flexible closed chain of individual links or a flexible band configured to enclose the pipe and the flexible composite carriage installed on the pipe, wherein the clamping device has at least one detachable link and at least one carriage component of the flexible composite carriage is equipped with a tensioning mechanism that ensures a required hold-down pressure of the flexible composite carriage to the pipe outer surface by means of the clamping device and is configured to control the hold-down pressure by means of an elastic element.

5. The device according to claim 4, wherein the carriage components of the flexible composite carriage additionally comprise upper rollers or chain sprockets positioned in top corners of the carriage components; side rollers or chain sprockets positioned on side surfaces of the carriage components, provided that when implementing the clamping device as a flexible metal band, additional chain sprockets are installed in the end carriage components of the flexible composite carriage, and the chain bends around these sprockets when passing between the said chain sprocket and pipe outer surface.

6. The device according to claim 1, wherein the clamping device is made as a system of magnets installed in the carriage components of the flexible composite carriage and equipped with a mechanical system configured to change an attractive force between the system of magnets and the pipe by changing a position of the magnets relative to the pipe surface, and wherein the pipe surface is made of steel.

7. The device according to claim 1, wherein the torque source of the flexible composite carriage drive mechanism is an electric motor, a hydraulic motor or an air motor.

8. The device according to claim 4, wherein the elastic element of the tensioning mechanism is configured to control a tension force of the clamping device via a spring system or a pneumatic cylinder, or a pneumatic muscle.

9. The device according to claim 1, wherein the functional unit for pipe processing is made as a welding torch of MIG/MAG or TIG welding and a torch movement mechanism, or as a cutting head of gas-flame or plasma cutting and a cutting head movement mechanism, or as a milling cutter with a drive and a milling cutter movement mechanism, or as a diagnostic device and a diagnostic device movement mechanism.

* * * * *